United States Patent
Yang et al.

(10) Patent No.: US 10,284,870 B1
(45) Date of Patent: May 7, 2019

(54) ADJUSTING INTERPOLATION PHASE FOR MOTION ESTIMATION MOTION COMPENSATION USING IMAGE ANALYSIS

(71) Applicant: Pixelworks, Inc., Portland, OR (US)

(72) Inventors: Minghui Yang, Shanghai (CN); Neil Woodall, Newport Beach, CA (US); Bob Zhang, Santa Clara, CA (US); Guohua Cheng, Shanghai (CN); Xuan Wu, Shanghai (CN)

(73) Assignee: PIXELWORKS, INC., Portland, OR (US)

( * ) Notice: Subject to any disclaimer, the term of this patent is extended or adjusted under 35 U.S.C. 154(b) by 306 days.

(21) Appl. No.: 14/806,289

(22) Filed: Jul. 22, 2015

(51) Int. Cl.
*H04N 19/513* (2014.01)
*H04N 7/01* (2006.01)
*H04N 19/176* (2014.01)
*H04N 19/109* (2014.01)

(52) U.S. Cl.
CPC ........... *H04N 19/513* (2014.11); *H04N 7/014* (2013.01); *H04N 19/109* (2014.11); *H04N 19/176* (2014.11)

(58) Field of Classification Search
CPC ...... H04N 7/015; H04N 7/50; H04N 7/26244; H04N 5/145; H04N 7/26765; H04N 7/26015
See application file for complete search history.

(56) References Cited

U.S. PATENT DOCUMENTS

| | | | | |
|---|---|---|---|---|
| 5,329,309 A * | 7/1994 | Dorricott | ............. | H04N 19/615 348/446 |
| 8,243,801 B2 * | 8/2012 | Yamauchi | ............... | G06T 7/223 375/240.12 |
| 2001/0017889 A1 * | 8/2001 | Borer | ..................... | H04N 7/014 375/240.16 |
| 2004/0252759 A1 * | 12/2004 | John Winder | ......... | H04N 5/145 375/240.12 |
| 2007/0160145 A1 * | 7/2007 | Kwon | .................. | H04N 7/0132 375/240.16 |
| 2007/0273787 A1 * | 11/2007 | Ogino | .................... | H04N 7/015 348/441 |
| 2010/0253835 A1 * | 10/2010 | Zhou | ...................... | H04N 7/014 348/441 |
| 2011/0032419 A1 * | 2/2011 | Sakaniwa | ............ | H04N 7/0132 348/452 |
| 2011/0310295 A1 * | 12/2011 | Chen | .................... | H04N 19/577 348/441 |
| 2015/0302819 A1 * | 10/2015 | Weksler | ........... | H04N 21/44008 345/611 |
| 2017/0054938 A1 * | 2/2017 | Xu | ........................ | H04N 5/145 |

* cited by examiner

*Primary Examiner* — Mohammed Jebari
(74) *Attorney, Agent, or Firm* — Miller Nash Graham & Dunn LLP

(57) ABSTRACT

A method of adjusting motion in a video sequence, includes performing motion estimation on an original video sequence and producing initial motion vectors and motion statistics, using the motion statistics to determine a level of motion estimation and motion compensation (MEMC) in the video sequence, adjusting a frame interpolation process based upon the level, and producing a frame interpolated video sequence from the original video sequence and the adjusted frame interpolation process.

15 Claims, 6 Drawing Sheets

ADJUSTING INTERPOLATION PHASE FOR MOTION ESTIMATION MOTION COMPENSATION USING IMAGE ANALYSIS

BACKGROUND

Motion Estimation and Motion Compensation (MEMC) technology is a popular video processing technique to reduce film judder and motion blur effects when watching film or video. Movies are shot at 24 frames per second, and other display devices often show them at higher frame rates. The higher frame rates result from frame interpolation, in which new frames of data are generated between the existing frames of data. MEMC reduces the motion blur that may happen with moving objects between the frames of original data, and can reduce the film judder. Film judder makes movements look slightly jerky in addition to the blur when displayed.

Unfortunately, while MEMC reduces the judder and motion blur, it also changes the look and feel of a scene, significantly altering the scene's emotional impact. This change is often referred to as the Soap Opera Effect (SOE) because it causes the cinematic feel of a movie to degrade to something that was shot using a low budget video camera. However, while the audience is used to seeing content that was shot at 24 frames per second, the low frame rate can sometimes cause artifacts that distract from the image. If a way existed to eliminate these distractions, the director would probably use it.

Current methods of making these adjustments gives the user control of how smooth the MEMC process will work, but without regard to the actual content of the scene. Typically, the user selects a setting for the display and the system applies that setting for all content. The only exception that usually exists applies to frames or regions where the MEMC process detects that it has not found the true motion vectors. When this happens, the MEMC process enters a fall back mode, such as some level of MEMC between the user setting and just doing a full frame repeat to generate the missing frames. This is unsatisfactory because no single setting can result in the correct tradeoff between judder and SOE artifacts for all the different types of content in a scene.

SUMMARY

One embodiment comprises a method of adjusting motion in a video sequence. The method includes performing motion estimation on an original video sequence and producing initial motion vectors and motion statistics, using the motion statistics to determine a level of motion estimation and motion compensation (MEMC) in the video sequence, adjusting a frame interpolation process based upon the level, and producing a frame interpolated video sequence from the original video sequence and the adjusted frame interpolation process.

DETAILED DESCRIPTION OF THE EMBODIMENTS

As discussed above, typical display systems have the ability to either apply full motion estimation motion compensation (MEMC), meaning full interpolation, or not at all. This leaves the viewer with the choice of either watching a film with full Soap Opera Effect (SOE) or judder, the jerking of objects in the scenes due to the frame rate conversion issues.

What is needed is a method to analyze the content of a scene, either the entire frame or smaller regions and then adjust the interpolation process automatically to eliminate the distracting type of judder type of artifacts, while maintain the cinema feel in either other scenes or other regions of the same scene. The two main methods to reduce judder type artifacts are to increase the frequency of the judder or decrease the amplitude of the judder while keeping the frequency the same. In some cases, it is possible to change the primary frequency of the 24 Hz judder to another frequency such as 30 Hz without significantly changing the amplitude. In this case, the objectionable uneven nature of the 24 Hz judder on a 60 Hz displays is eliminated while preserving the cinematic feel of the movie. This is shown in FIGS. 1A-1D. It is also possible to decrease the judder by varying the refresh rate of the display itself. That is, instead of having a fixed frequency display running at 60 Hz, it is possible to refresh the display at 24, 30, 60 or several other frequencies depending on the display technology.

Figure 1A:
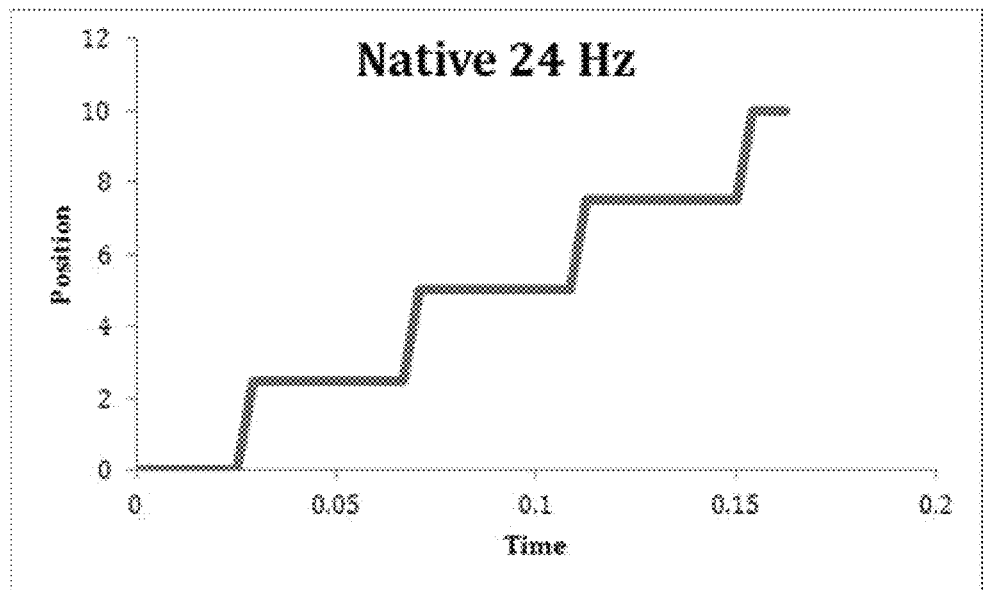
FIGS. 1A-1D show graphs of different scenarios of judder on different displays.
Figure 1B:
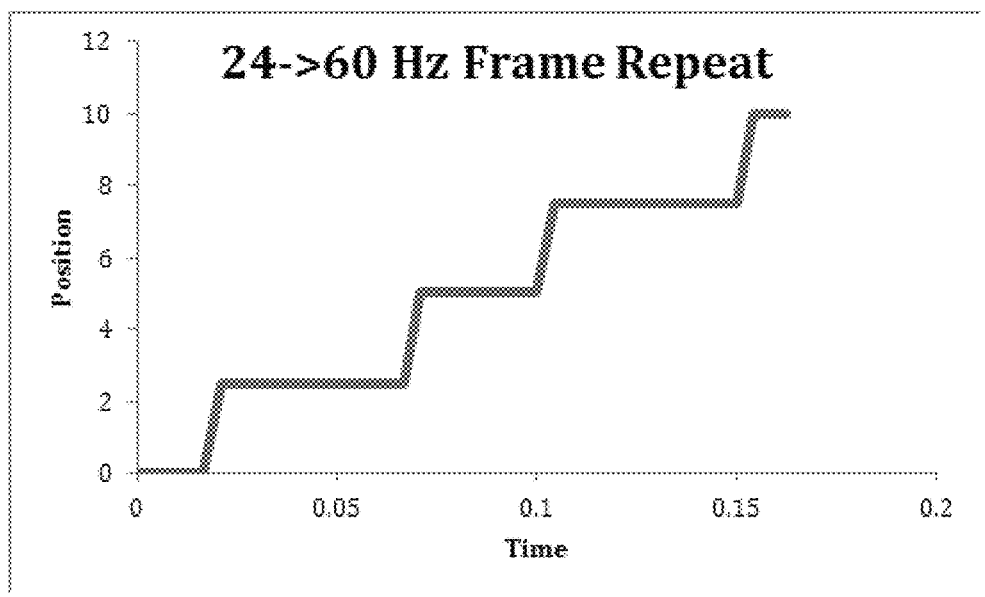
Figure 1C:
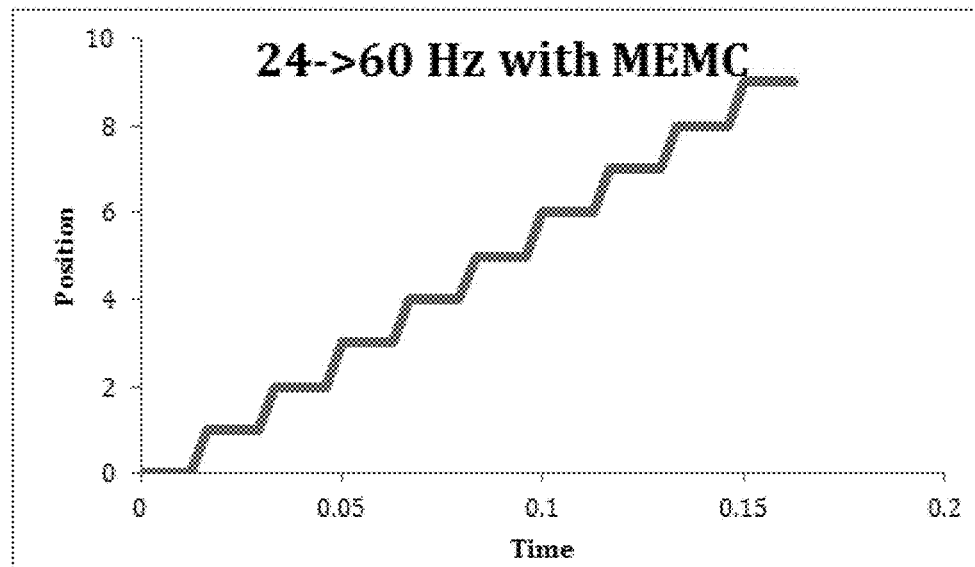
Figure 1D:
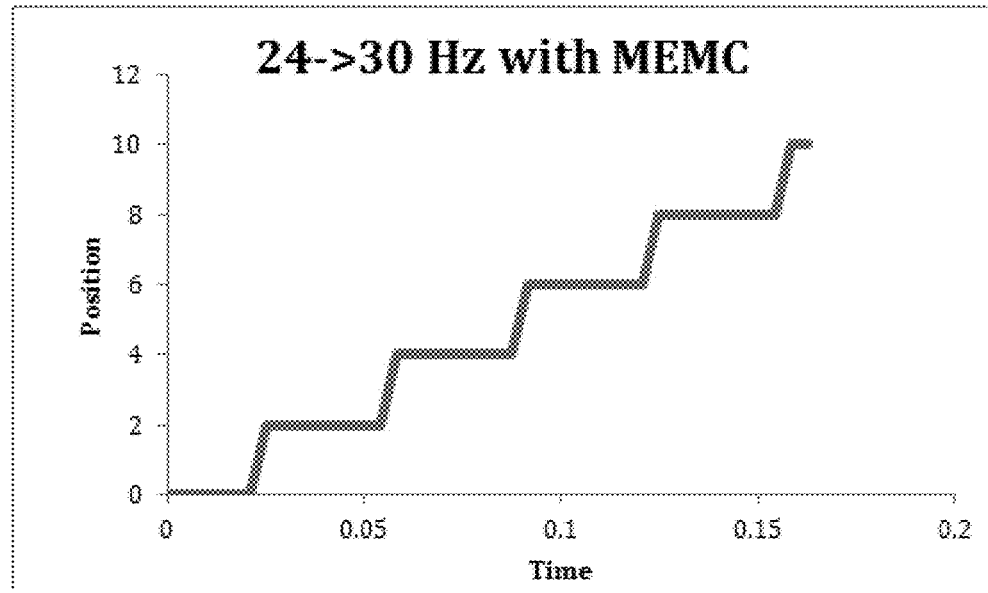

FIG. 1A shows an example of steady motion in the 24 Hz film contents, time against the change in the object's position, which is a motion along a single direction. FIG. 1B shows uneven judder when it is displayed on a 60 Hz panel. As can be seen, each step has a different time interval. FIG. 1C shows that the motion will be smooth after full MEMC on the 60 Hz panel. FIG. 1D shows the resulting judder if one were to keep 30 Hz judder after MEMC on the 60 Hz panel.

Figure 2:
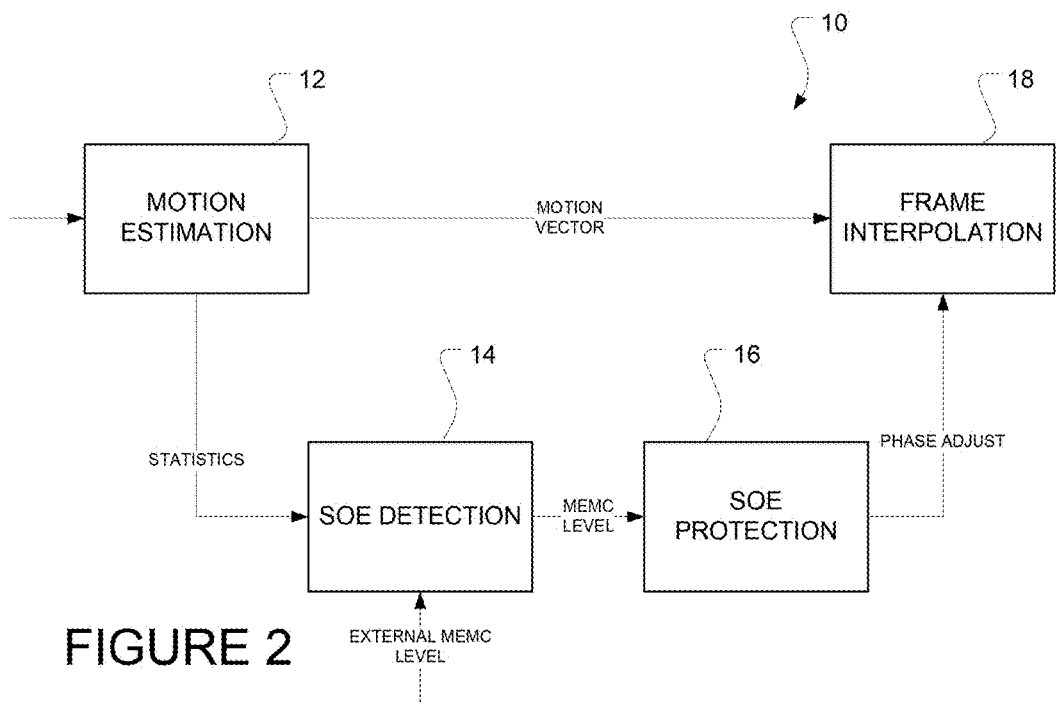
FIG. 2 shows a block diagram of an embodiment of SOE optimization for MEMC.

To reduce both the judder and the SOE artifacts for MEMC, a SOE detection and SOE protection function are used in the MEMC algorithm. FIG. 2 shows an embodiment of an SOE optimization module 10 for MEMC processes used in frame interpolation. An SOE detection function 14 receives statistics from the motion estimation function 12 and then generates an MEMC level signal for each region and for the entire frame. The MEMC level signal will be used to determine the appropriate amount and type of Frame Interpolation (FI) phase adjustment 18. An externally supplied MEMC level can also modify the amount of FI phase adjustment and is provided to the SOE detection function 14 to allow it to adapt the MEMC level provided. The SOE protection function 16 uses the MEMC level to adjust the phases and then provides that information to the frame interpolation function 18. Content makers can edit the MEMC levels based on their own requirement and embedded the data in the video stream to reduce the SOE issue.

One should note that the adjustment of the phases may occur as part of the motion estimation process or the frame interpolation process. In both cases, the initial motion vectors are calculated for the motion from the previous frame to the current frame (0 phase) and optionally from the current frame to the previous frame (1 phase). These calculations provide the statistics that allow the determination of the MEMC level. Once the 0 and 1 phases are calculated, then the motion estimation process calculates the intermediate phases. In one embodiment for the process to change the intermediate phases, the process would do so before calculation of the motion vectors for that phase, that is, the phase adjustment occurs in the motion estimation process. In another embodiment, the initial motion vectors are calculated and then the motion vectors for intermediate phases are interpolated from the 0 and 1 phases. In this case, the frame interpolation process is changed in response to the MEMC level.

One goal of the SOE detection function is to auto-detect the MEMC level of the video content while optionally matching the content provider's requirements. When the MEMC level is modified by external information, for example by embedding information to provide the "director cut", the goal of the algorithm is to match the intent of the director for a scene. The director cut information guides the MEMC results so that the feel of the scene is not changed on the video content because it is what the director intended you to see.

The SOE protection function will adjust the phases that are used in frame interpolation based on MEMC level. When MEMC level is low, the adjusted phase will be closer to the SOE phase. When MEMC level is high, the adjusted phases will be closer to the full interpolation phases that provide smooth MEMC results.

The main advantage of MEMC video processing is to reduce the film judder and motion blur effects. For film content, the primary purpose of MEMC is to reduce film judder. Normally frames or regions of the frames that have the following characteristics need MEMC processing to improve the video watching experience. For the following discussion, the judder level means the amount of judder artifacts when no MEMC is applied. The measurements are done based on the input to the motion estimation process and that is before MEMC is applied. The statistic only has meaning if MEMC is not being applied. When MEMC is applied, it eliminates or mitigates the amount of judder.

If the frame or area has steady motion and high contrast, then it can show obvious motion judder, and if the frame or area has low motion objects with many details, then MEMC is needed to de-blur. Therefore the judder level signal should be high. That is, the scene will benefit by decreasing the amplitude or increasing the frequency of the judder by increasing the amount of MEMC that is applied. In the simplest case, if the judder signal is high then MEMC should be applied. If there is a high SOE, then MEMC is not applied.

However, there are several kinds of scenes that might have the SOE effect if MEMC is applied. The following kinds of scenes should result in the SOE level being set high. If the motion in the scene is temporally inconsistent or has random motion, such as battle scenes in some war films, then it is better to set the SOE level to a high value to avoid removing the jerkiness of the motion. If the moving parts have few details or low contrast, such as blurry background motion; if the moving part of the frame is very small, such as people talking and driving; or if the frame has very fast motion and few details, then it is better to increase the SOE level. In addition, if the reliability of the motion vector is low, it is better to bias the result towards using frame repeat.

Figure 3:
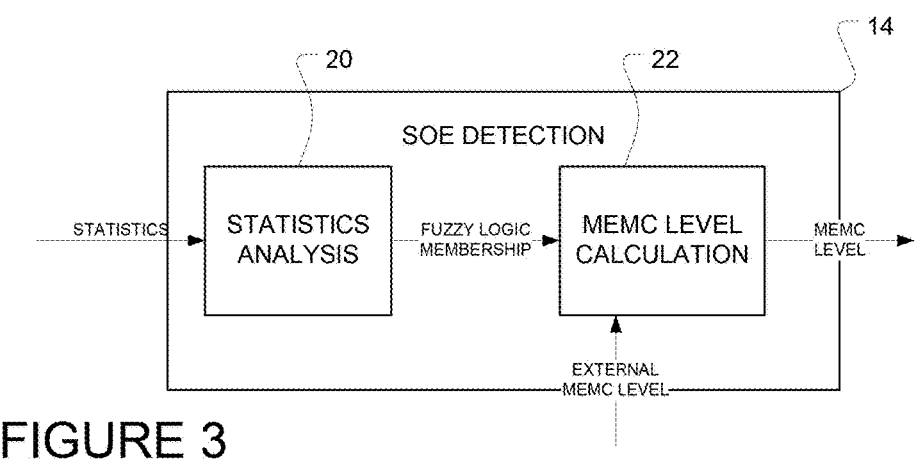
FIG. 3 shows a block diagram of an embodiment of SOE detection.

In FIG. 3, the statistics analysis function will read the statistics from motion estimation function and output the frame and block level judder level and SOE level based on the analysis results. In one embodiment, block level statistics for the motion estimation process are converted to a level representing its membership in an SOE or Judder artifact set. For fuzzy logic transformations, it is typical to use a piecewise linear (PL) function. The following equation is a generic approach to classifying the block level statistic into membership of either the Judder or SOE artifact set.

$$\text{Fuzzy\_set} = PL(\text{stat}) = \min(1, \max(0, \text{gain}*(\text{stat-offset})))$$

The gain and offset parameters are determined based on the evaluation of several types of scenes and the feedback of an expert. If the gain is positive, then the function is a monotonically increasing function; and if the gain is negative, then it is a monotonically decreasing function.

In the motion estimation process, several types of statistics are routinely generated in order to select the true motion vector that represents the object's motion, to detect cover or uncover areas, and to judge the overall quality of the motion vectors. Some of these are directly applicable to the detection of whether or not SOE or Judder artifacts are impacting the region in question.

Block SAD (SAD) is the Sum of Absolute Differences between two blocks using the selected motion vector for that block. This value is usually adjusted by several factors before it is used, but in general high values imply that the motion vector selected is not accurate or that it is in a cover/uncover area. Note, that while SAD (and 0mvSAD and SADNP below) is the easiest statistic to generate to judge whether a motion vector is accurate, other statistics that judge the match between two blocks or regions can also be used. For example, sum of square differences and mean square error are two alternatives out of many.

Zero MV SAD (0mvSAD) is generated because the zero MV is usually a candidate in the motion estimation process. If the 0mvSAD is large, then the motion is causing a high contrast change in that region.

Nearest Pixel SAD (SADNP) is a measurement of the amount of detail in a block. It is generated because areas with high detail usually have higher block SADs due to the fixed sampling grid. It is used to adjust the block SAD value to compensate for this effect.

Temporal MV difference (TprDiff) statistic is the MV difference between current frame and previous frame of a block. This statistic can be used to denote the MV temporal consistency. Large values mean the object has random motions and less MEMC is needed.

Returning to the 6 types of moving objects that exhibit the characteristics that lead to either judder or SOE type of artifacts, discussed above, one can create a function of the 4 block and frame level measurement that indicates its membership in the judder or SOE artifact case.

The set memberships are then combined to create an overall MEMC level signal. The fuzzy logic classification can be applied at the block level using the statistic for a block, a regional level, using the sum of the block statistics in that region, or on the full frame using the sum of the block statistics in for the full frame.

Going back to the general descriptions of what type of content results in judder and SOE artifacts fuzzy logic is applied to the statistics to determine the membership in a fuzzy set. In the descriptions below, MV is the selected motion vector for a block and |MV| is the magnitude of that motion vector.

For the case of high contrast objects, using the 0mvSAD statistic is appropriate. In addition, the block should be moving. Therefore, one can combine or find the intersection of the membership of the block in high contrast and moving sets (HCM). This can be found as follows:

$$b\text{Judder1} = HCM = PL1(0mvSAD)*PL2(|MV|)$$

$$f\text{Judder1} = \text{sum}(HCM)$$

Where bJudder represents the judder level for a block and fJudder represents it for the frame, and PL1 and PL2 are monotonically increasing functions. Note, that an alternative method of obtaining the frame judder level in this case would be to create a histogram of the zeroMVsad statistic and then apply a weight to each bin of the histogram and then sum that result. It should also be noted that while multiplication is used in the above example, and those that follow, to find the intersection of the two sets, using a min function is also possible. That is, bJudder1a=HCM=min(PL1(0mvSAD),PL2(|MV|)).

The second judder measurement, low motion with many details, is partially covered by the 0mvSAD statistic. However, the amount of contrast required may not be as high and there might be periodic patterns that result in a low 0mvSAD even though there is motion. Therefore one needs to consider the case where there is motion and the amount of detail is high. That is, a high SADNP and motion. This can be expressed as the combination of two piecewise linear functions:

$$bJudder2 = Moving\ Detail = PL3(SADNP)*PL2(|MV|)$$

$$fJudder2 = sum(Moving\ Detail)$$

To get the overall judder level we can take a weighted sum of the two judder levels for the block level statistic. Other methods are also possible. For example, maximum of the two measurements could be used. Both are shown below:

$$bJudder = k1*bJudder1 + k2*bJudder2, or$$

$$bJudder = max(k1*bJudder1, k2*bJudder2)$$

where k1 and k2 are weighting factors. However, for the frame level statistic, the number of blocks may be important, therefore a piece wise linear function of the frame level values should be performed before doing the sum. That is:

$$fJudder = PL4(fJudder1) + PL5(fJudder2), or\ alternatively$$

$$fJudder = PL(sum(bJudder)).$$

The rest of the measurements indicate when doing MEMC results in SOE artifact. The first of SOE artifact measurements is the temporal consistency of the motion. That is, whether or not the motion is "jerky" or represents a steady motion. For cover and uncover analysis, abrupt changes in the motion vector are a clue that an area is cover or uncover. In addition, a high SAD also occurs, indicating that the motion vector quality is poor is because the object or portion of the object in question is not in both frames. Only when the motion vector quality is high is this an indication that the object is moving in a jerky fashion. Therefore, the measurement should be a combination of the TprDiff and the SAD for the selected motion vector. That is:

$$badMV = max(0, SAD - k*SADNP)$$

$$bSOE1 = PL6(|TprDiff|)*PL7(badMV)$$

$$fSOE1 = sum(bSOE1).$$

where |TprDiff| is the magnitude of the temporal motion vector differences, PL6 is monotonically increasing and PL7 is monotonically decreasing. Optionally, instead of using the SAD value above, other measures of the motion vector reliability can be used that are typically generated as part of the motion estimation process.

For the SOE case of moving objects with low level details and the case for fast moving objects, both suggests that the process should combine the SADNP statistic with the motion level. That is, low level detail with motion results in an SOE type of artifact $$bSOE2 = moving\ low\ detail = PL8(SADNP)*PL9(|MV|)$$

$$fSOE2 = sum(moving\ low\ detail).$$

where PL8 is a monotonically decreasing function and PL9 is monotonically increasing.

The third type of SOE artifact occurs when only a small portion of the scene is moving. In this case, there is not a block level statistic that can be used. The process simply counts the number of blocks that are considered moving. While the process has used PL2 and PL3 to indicate membership in the moving set, this is likely to use a different threshold for that membership. Therefore the process has fSOE3=sum(PL10(|MV|)).

Similar to finding the overall judder level above, one can do a similar process for the SOE level. For example, $$bSOE = k4*bSOE1 + k5*bSOE2, or$$

$$bSOE = max(k4*bSOE1, k5*bSOE2)$$

$$fSOE = PL11(fSOE1) + PL12(fSOE2) + PL13(fSOE3), or$$

$$fSOE = PL(sum(bSOE)) + PL13(fSOE3), or$$

$$fSOE = max(PL(sum(bSOE)), PL13(fSOE3))$$

Finally, the process needs to take into account how well the motion estimation process is finding the true motion vectors for an object. While in general, judging the reliability of motion vectors is complex, the basic approach is to use the block SAD and then adjust that value, by for example, subtracting the amount of detail or SADNP. Too high of a value indicates that the MV is not reliable. Regardless of the method, all MEMC algorithms have some way to determine whether or not they should be doing MEMC or doing frame repeat because too many motion vectors are unreliable. For the purpose of determining the MEMC level with respect to judder and SOE artifacts, the process needs to take this measurement into account to bias the result away from doing full MEMC when the motion vectors are unreliable.

$$fBadMV = sum(badMV).$$

Finally, one can combine the different functions to determine the overall MEMC level for a specific block or group of pixels, and one for the overall frame.

$$bMEMC = bJudder - bSOE$$

$$fMEMC = fJudder - fSOE - PL14(fBadMV).$$

Figure 4:
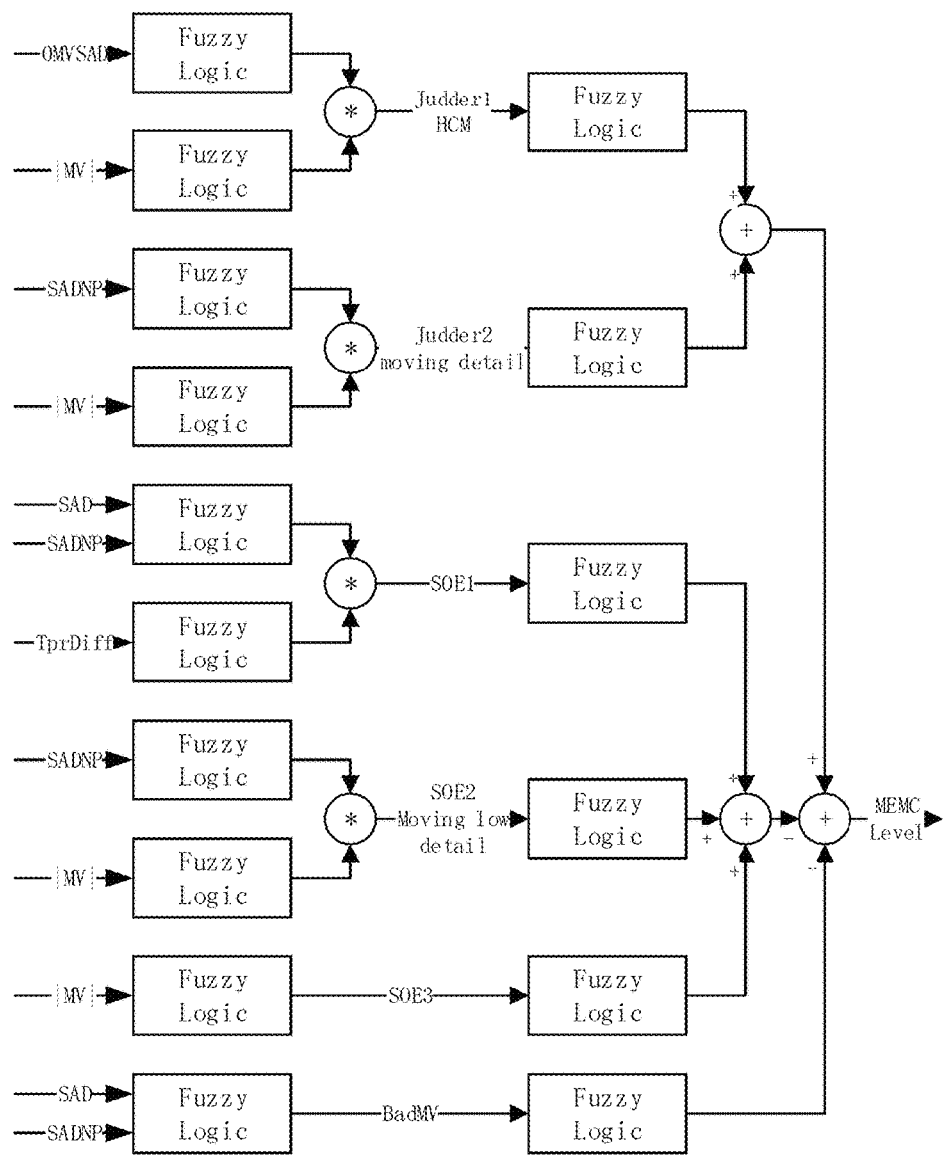
FIG. 4 shows a block diagram of an embodiment of a fuzzy logic determination for a membership set.

This process is shown in FIG. 4.

In addition to locally generated statistics, it is possible for the content creator to embedded in the digital video data the desired level of MEMC. This level can be combined with the locally generated data to obtain the final judder level measurement to determine the selection of the frame interpolation phases to be used. For example, one might allow the user to select the percentage of following the director's intent by the following equation:

$$Total\ MEMC = fMEMC - \%\ of(Director\_MEMC - fMEMC).$$

Figure 5:
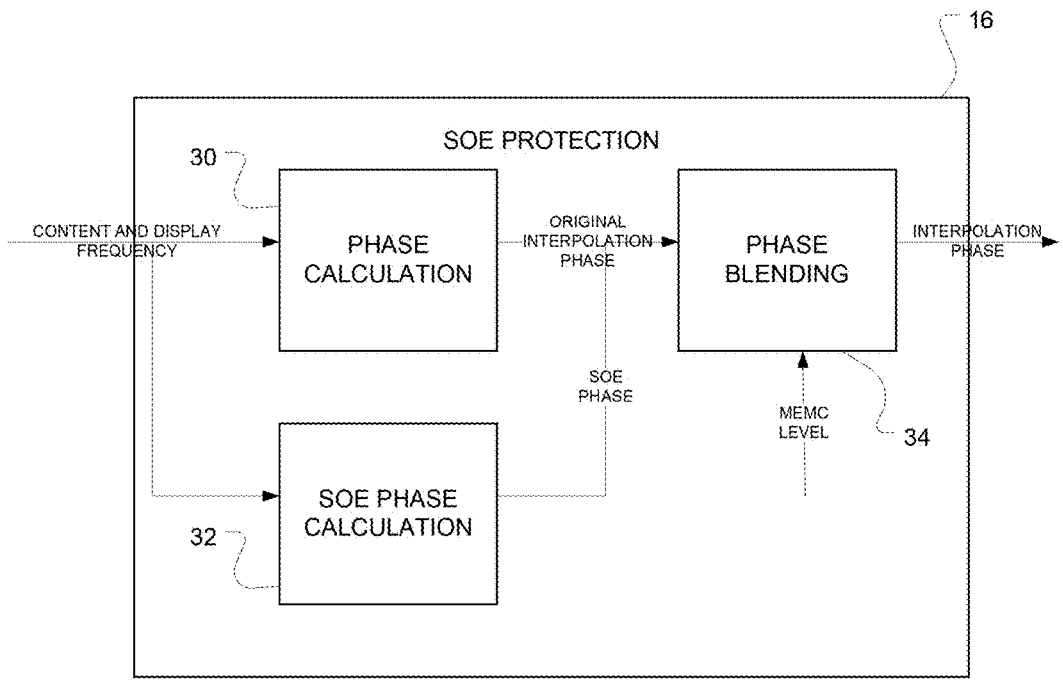
FIG. 5 shows a block diagram of an embodiment of SOE protection.

As shown in FIG. 5, the SOE Protection function 16 includes three parts: phase calculation 30, SOE phase calculation 32 and phase blending functions 34. In FIG. 5, the phase calculation function 30 will generate original interpolation phase based on the content frequency and display frequency. For example, when 24 fps film content is displayed on a 60 Hz panel, in order to get smooth MEMC effect, the time interval of the displayed frames should be ⅖ of the original time interval of the original content. Thus, the generated phase would be 0 phase between frame A and B, ⅖ phase between frame A and B, ⅘ phase between frame A and B, ⅕ phase between frame B and C, ⅗ phase between frame B and C, etc.

The SOE phase calculation function 32 generates interpolation phases with the 0 MEMC level. The function will first check the content frequency and display frequency. If the display frequency is an integer multiple of the content frequency, then a full-repeat strategy is the best way for those scenes with 0 MEMC level, and the SOE phase should be set to 0 phase.

Figure 6:
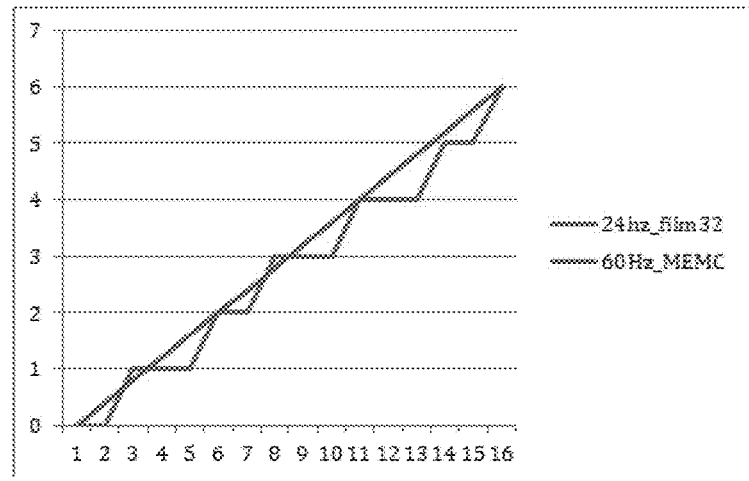
FIGS. 6 and 7 show graphs of different degrees of judder.
Figure 7:
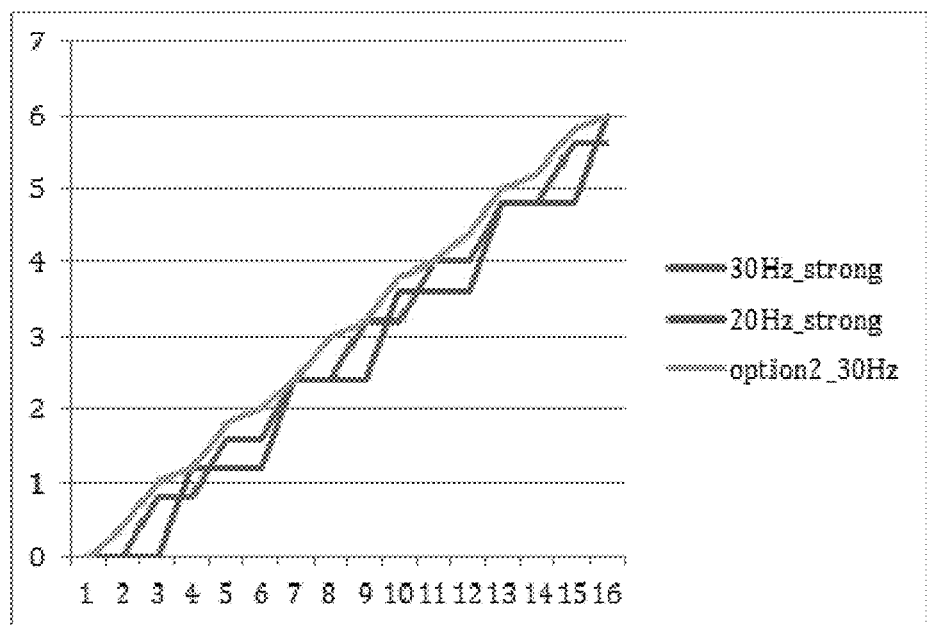

If the display frequency is not divisible by the content frequency, several phase strategies can be used for maximal judder level scene instead of full-repeat strategy. For example, 24 fps film content is displayed on the 60 Hz panel, one option is to adjust the fallback phase to 30 Hz or 20 Hz type of judder (which evenly divide into 60 Hz) to remove the uneven judder. Another option is to include the 30 Hz or 20 Hz frequency into the original 24 Hz interpolation phase to reduce the uneven judder. The first option can get an even judder that is very similar to the cinema feel, and the second option can result in more original frames to reduce the MEMC artifacts. The table below is the example of SOE phase strategy and FIG. 6 shows the curve of these phase strategy.

is required if different input frame rates are supported. For example, in the table below, the MEMC level varies from 0 to 15 and the display frame rates for two different input frequencies are shown. One can vary the display frequency to adjust the judder and/or SOE effect.

| MEMClevel | Input frequency | |
|---|---|---|
| | 24 Hz | 30 Hz |
| 0 | 24 | 30 |
| 1 | 24 | 30 |
| 2 | 48 | 48 |
| 3 | 54 | 60 |
| 4 | 60 | 67.5 |
| 5 | 66 | 75 |
| 6 | 72 | 82.5 |
| 7 | 78 | 90 |
| 8 | 84 | 97.5 |
| 9 | 90 | 105 |
| 10 | 96 | 112.5 |
| 11 | 102 | 120 |
| 12 | 108 | 120 |
| 13 | 114 | 120 |
| 14 | 120 | 120 |
| 15 | 120 | 120 |

In this manner, one can apply the MEMC function in such a manner as to take into consideration the content of the scene. This allows the content to retain the cinematic feel of a movie filmed at 24 Hz when displayed on a 60 Hz or 120 Hz display, while avoiding the SOE effect. One should note

| Source | A | | B | | C | | D | | E | | F | | G |
|---|---|---|---|---|---|---|---|---|---|---|---|---|---|
| 60 Hz_MEMEC | 0 | 0.4 | 0.8 | 1.2 | 1.6 | 2 | 2.4 | 2.8 | 3.2 | 3.6 | 4 | 4.4 | 4.8 | 5.2 | 5.6 | 6 |
| 24 Hz_File 32 | 0 | 0 | 1 | 1 | 1 | 2 | 2 | 3 | 3 | 3 | 4 | 4 | 5 | 5 | 5 | 6 |
| 30 Hz_judder_strong | 0 | 0 | 0.8 | 0.8 | 1.6 | 1.6 | 2.4 | 2.4 | 3.2 | 3.2 | 4 | 4 | 4.8 | 4.8 | 5.6 | 5.6 |
| 20 Hz_judder_strong | 0 | 0 | 0 | 1.2 | 1.2 | 1.2 | 2.4 | 2.4 | 2.4 | 3.6 | 3.6 | 3.6 | 4.8 | 4.8 | 4.8 | 6 |
| Option2_30 Hz | 0 | 0.4 | 1 | 1.2 | 1.8 | 2 | 2.4 | 3 | 3.2 | 3.8 | 4 | 4.4 | 5 | 5.2 | 5.8 | 6 |

Customers can select the fallback strategy based on their preference. Also, the reason for a low MEMC level can be used to select the appropriate fall back method. If the reason for a low MEMC level is because of bad motion vectors, then a fall back strategy that uses more original frames is more appropriate because it reduces the amount of frame interpolation artifacts. If, however, the reason for the low MEMC level is because SOE type of artifacts are detected, using an interpolation strategy with more even judder is more appropriate.

A phase blending function is used to blend the original MEMC phase (60 hz_MEMC in the table) and the SOE fallback phase (the other table rows). The blending factor is the MEMC level. When MEMC level is low, the blending phase will be closer to original SOE fallback phase; when MEMC level is high, the blending phase will be closer to original phase.

When the display supports varying the frame rate, then the MEMC level is the input to a monotonically increasing function that produces a frame rate between the max frame rate supported by the display (high MEMC level) and the larger of either the min frame rate supported by the display or the frame rate of the original content (low MEMC level). To simplify the architecture, the design might also limit the display frequencies to a fixed number of frequencies. In either case, one or more 1D LUT might be used to implement the function that maps the MEMC level to the display frequency. Furthermore, more than one function or 1D LUT that the system can use just the motion level, such as when the native input frame rate is 60 Hz because there are no judder artifacts.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of adjusting motion in a video sequence, comprising:
   performing motion estimation on an original video sequence and producing initial motion vectors and motion statistics;
   detecting a soap opera effect level based on the motion statistics;
   detecting an amount of judder in the original video sequence based on the motion statistics;
   determining a reliability of the initial motion vectors;
   determining a level of motion estimation and motion compensation (MEMC) in the video sequence using the soap opera effect level, the amount of judder, and the reliability of the initial motion vectors;
   determining a first set of interpolation phases when the level of MEMC is high;

determining a second set of uneven interpolation phases when the level of MEMC is low;

adjusting a frame interpolation process based upon the determined level of MEMC in the video sequence by blending the first set of interpolation phases and the second set of uneven interpolation phases based on the determined level of MEMC in the video sequence; and producing a frame interpolated video sequence from the original video sequence and the adjusted frame interpolation process.

2. The method of claim 1, wherein adjusting the frame interpolation process comprises producing a frame interpolation phase from blending a full MEMC phase with a MEMC phase to which MEMC is not applied.

3. The method of claim 1, wherein adjusting the frame interpolation process comprises varying the frame rate of the display.

4. The method of claim 1, wherein performing motion estimation comprises generating a first phase motion vector as an initial motion vector.

5. The method of claim 1, wherein performing motion estimation comprises generating a zero phase motion vector as an initial motion vector.

6. The method of claim 1, wherein producing motion statistics comprises producing at least one of: block sum of absolute differences (SAD); zero motion vector SAD; nearest pixel SAD; temporal motion vector differences; and a statistical histogram.

7. The method of claim 1, wherein the adjusting the frame interpolation is applied to a region comprising one or more blocks.

8. The method of claim 1, wherein the adjusting the frame interpolation is applied to one or more frames of image data.

9. The method of claim 6, wherein using motion statistics comprises:

applying fuzzy logic to the motion statistics and a magnitude of a motion vector;

combining results of the fuzzy logic applied to the motion statistics and results of the fuzzy logic applied to the magnitude of the motion vector to produce combined results; and applying fuzzy logic to the combined results to produce a MEMC level.

10. The method of claim 1, wherein adjusting a frame interpolation process comprises adjusting the frame interpolation process that occurs as part of the motion estimation.

11. The method of claim 1, wherein adjusting a frame interpolation process occurs after producing initial motion vectors as part of the motion estimation.

12. The method of claim 6, wherein detecting the soap opera effect level includes using the temporal motion vector differences and the block SAD when a motion vector quality is high and using nearest pixel SAD when the initial motion vectors indicate moving objects with low level details or fast moving objects.

13. The method of claim 6, wherein detecting the soap opera effect level includes counting a number of blocks moving.

14. The method of claim 6, wherein detecting the amount of judder includes using the zero motion vector SAD for high contrast objects and using the nearest pixel SAD when motion is present and an amount of detail is high.

15. The method of claim 1, wherein when the determined level of MEMC in the video sequence is low, the adjusting the frame interpolation process further includes blending the first set of interpolation phases and the second set of uneven interpolation phases based on the soap opera effect level or a motion vector quality.

* * * * *